United States Patent [19]

Hasebe

[11] Patent Number: 4,941,107
[45] Date of Patent: Jul. 10, 1990

[54] IMAGE DATA PROCESSING APPARATUS

[75] Inventor: Kouki Hasebe, Tokyo, Japan

[73] Assignee: Kabushiki Kaisha Toshiba, Kawaski, Japan

[21] Appl. No.: 121,884

[22] Filed: Nov. 17, 1987

[30] Foreign Application Priority Data

Nov. 17, 1986 [JP] Japan .................. 61-273655
Nov. 17, 1986 [JP] Japan .................. 61-273656

[51] Int. Cl.$^5$ .................. G06F 3/153; G06F 9/00
[52] U.S. Cl. .................. 364/518; 364/521; 364/200; 340/750; 340/798
[58] Field of Search ........ 364/521, 518, 200 MS File, 364/900 MS File; 340/750, 747, 706, 798, 799, 718, 732

[56] References Cited

U.S. PATENT DOCUMENTS

| | | | |
|---|---|---|---|
| 4,649,513 | 3/1987 | Martin et al. | 364/900 |
| 4,663,735 | 5/1987 | Novak et al. | 364/900 |
| 4,688,190 | 8/1987 | Bechtolsheim | 364/900 |
| 4,691,295 | 9/1987 | Erwin et al. | 364/900 |
| 4,700,182 | 10/1987 | Ohgami | 340/750 |
| 4,748,442 | 5/1988 | Allaire | 340/750 |
| 4,757,310 | 7/1988 | Katsura et al. | 340/798 |
| 4,773,026 | 9/1988 | Takahara et al. | 364/518 |

Primary Examiner—Gary V. Harkcom
Assistant Examiner—Phu K. Nguyen
Attorney, Agent, or Firm—Foley & Lardner, Schwartz, Jeffery, Schwaab, Mack, Blumenthal & Evans

[57] ABSTRACT

An image data processing apparatus for processing image data in a pipe line fashion includes an access controller for selectively generating addresses and control data in synchronism with a memory cycle in response to a start command, and for selectively and separately outputting the addresses onto address buses and the control data onto control buses. A plurality of memory planes selectively receive one address from one of the address buses, selectively receive one control data from one of the control buses, selectively output data stored at the received address onto one of the data buses in synchronism with the memory cycle in accordance with the one type of control data, selectively execute a predetermined processing operation between data input from at least one data bus and data stored in the received address, and selectively store a result of the processing operation at the received address, respectively, a main processor, in accordance with a processing command, outputs an access control command to the access control means and a plane control command to the plurality of memory plane means, and outputs a start command after completion of a setting operation.

20 Claims, 13 Drawing Sheets

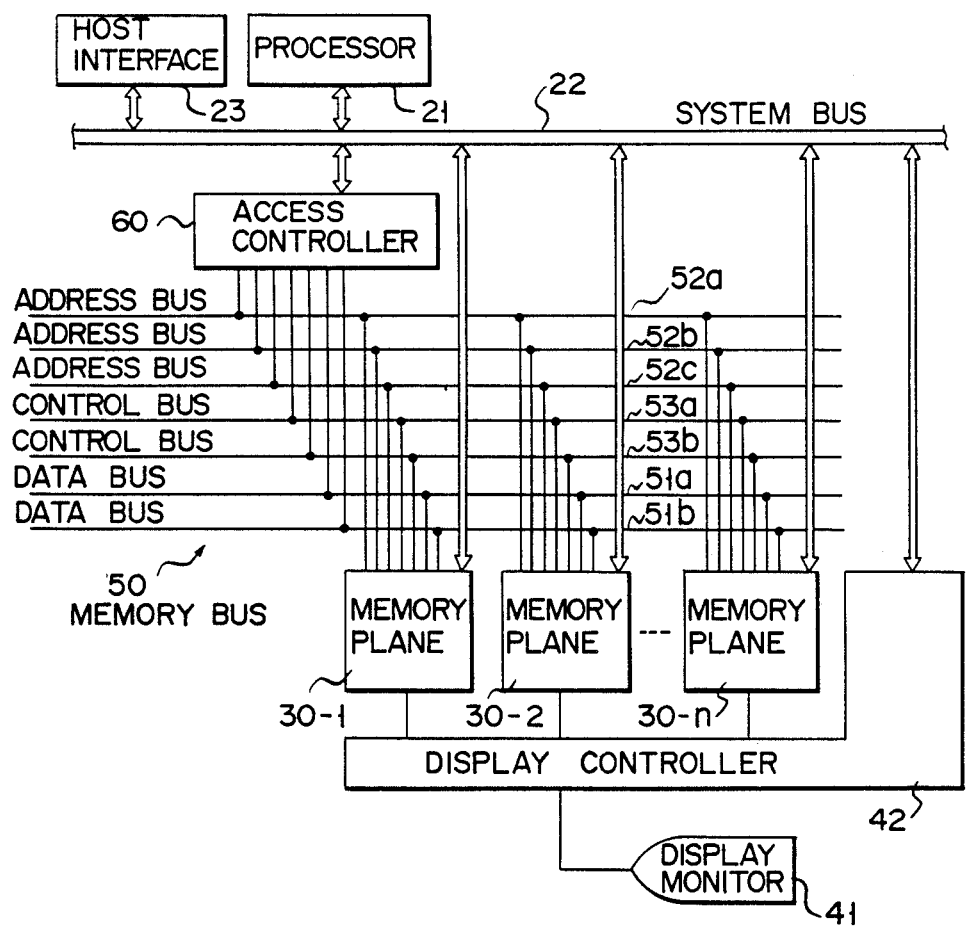
F I G. 4

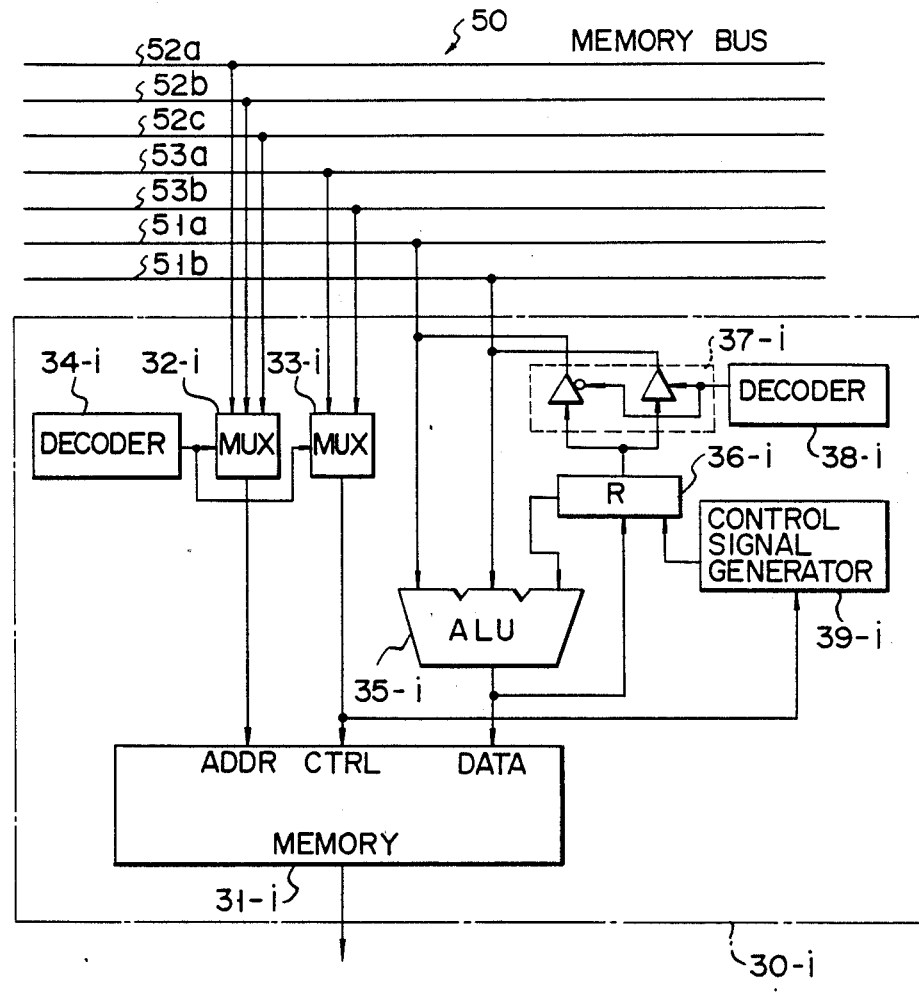
F I G. 5A
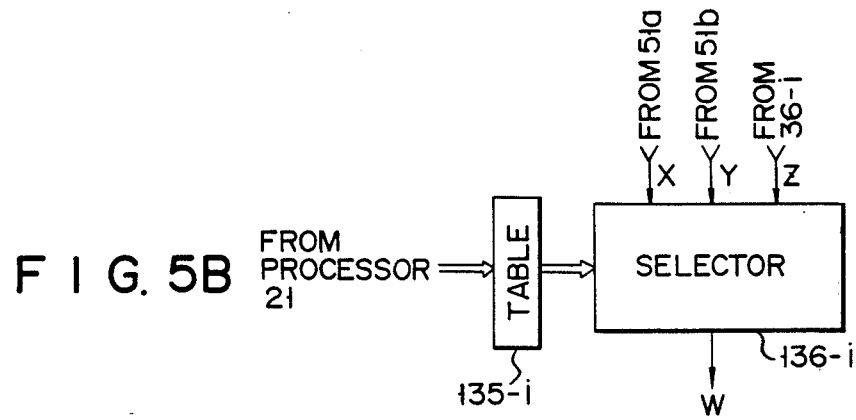
F I G. 5B

| X | 0 | 0 | 0 | 0 | 1 | 1 | 1 | 1 |
|---|---|---|---|---|---|---|---|---|
| Y | 0 | 0 | 1 | 1 | 0 | 0 | 1 | 1 |
| Z | 0 | 1 | 0 | 1 | 0 | 1 | 0 | 1 |
| W | 0 | 0 | 0 | 1 | 1 | 1 | 1 | 1 |

X+Y·Z̄

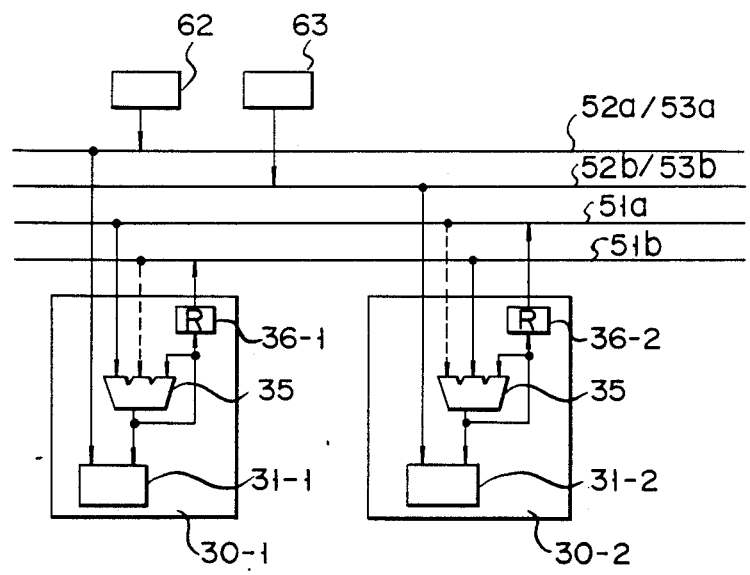
F I G. 10
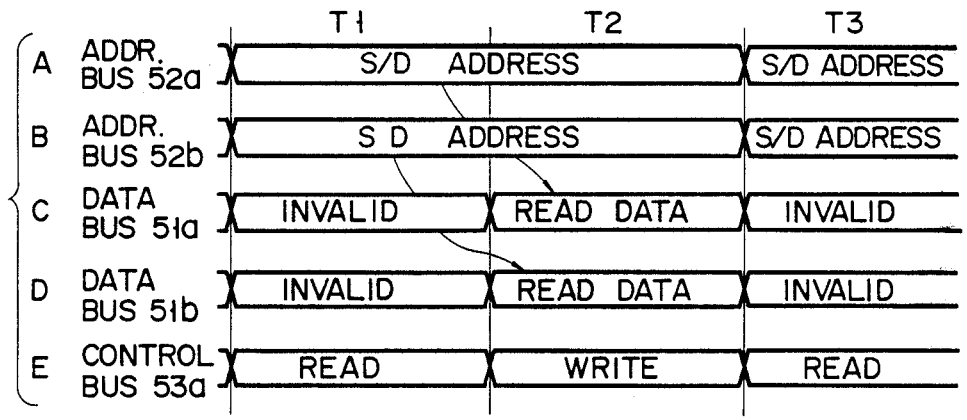
F I G. 11

| | | T1 | T2 | T3 |
|---|---|---|---|---|
| A | ADDR. BUS 52a | S/D ADDR. | S/D ADDR. | S/D ADDR. |
| B | ADDR. BUS 52b | S/D ADDR. | S/D ADDR. | S/D ADDR. |
| C | DATA BUS 51a | READ DATA | READ DATA | READ DATA |
| D | DATA BUS 51b | READ DATA | READ DATA | READ DATA |
| E | CONTROL BUS 53a | RMW | RMW | RMW |

IMAGE DATA PROCESSING APPARATUS

BACKGROUND OF THE INVENTION

This invention relates to a bit map image data processing apparatus provided with a plurality of bit map memory planes.

Conventionally, a bit map data processing apparatus using bit map memory planes, such as a bit map display apparatus, is generally constituted as illustrated in FIG. 1. In the bit map data processing apparatus with such a structure, it is assumed that memory plane 11-1 is used for registering of character font data and memory plane 11-2 is used for display. If the character font data is copied from memory plane 11-1 to memory plane 11-2 (between planes), in a first memory cycle a memory read operation is performed in memory plane 11-1 as a source plane, as shown in FIGS. 2A to 2C. Then, in a second memory cycle, a memory write operation is performed in memory plane 11-2 as a destination plane, as shown in FIGS. 2A to 2C. Transfer of image data of one word is carried out in this manner, and the same transfer operation is executed for the subsequent image data.

As should be clear from the above, even if the conventional bit map data processing apparatus has a plurality of memory planes, only one memory plane can function in a single memory cycle, so that data copying between planes undesirably requires two memory cycles for transferring of one word.

Recently, bit map data processing apparatuses should often perform a three-term calculation, namely, a logical operation between memory-resident data P0, image data P1 and image mask pattern P2. This three-term calculation is executed in the conventional bit map image data processing apparatus as shown in FIG. 3. Suppose that memory-resident data P0 is stored in memory plane 11-1, image data P1 in memory plane 11-2, and image mask pattern P2 in memory plane 11-$n$. In this case, a two-term calculation (an AND operation in an example shown in FIG. 3) between memory plane 11-$n$ as a source plane and memory plane 11-2 as a destination plane is executed first in the operation manner as illustrated in FIGS. 2A to 2C. Then, a two-term operation (an OR operation in the example of FIG. 3) between planes with memory plane 11-2 as the source plane and memory plane 11-1 as the destination plane is similarly executed. In this manner, according to the conventional bit map image data processing apparatus a three-term operation is realized by repeating a two-term operation at least twice. For a three-term operation of one word, therefore, four memory cycles are needed, thus delaying the processing speed.

To overcome this problem, there is a system proposed which sets an image mask pattern in a register or the like as a fixed value so as to eliminate the need to read out the image mask pattern from any memory plane. However, in this system the image mask pattern is restricted. In this respect, there is a strong and growing demand for an image data processing apparatus with a simple structure, which is capable of processing image data with a high speed.

SUMMARY OF THE INVENTION

With the above situation in mind, it is therefore an object of this invention to provide an image data processing apparatus that can process image data in a pipe line fashion. This processing apparatus comprises:

three address buses, two control buses, two data buses, a main control unit responsive to a processing command input thereto, for generating an access control instruction and a plane control instruction, and for generating a start instruction after the access control instruction and the plane control instruction are generated, an access control unit operating in synchronism with memory cycles and in response to the start instruction input thereto, for selectively and sequentially generating addresses each for one of a plurality of address regions to output each address onto one of the three address buses, in each memory cycle, and for selectively generating one or more control data to output each control data onto one of the two control buses in each memory cycle, in accordance with the access control instruction input thereto, at least one of the addresses as a destination address being generated delayed by one memory cycle from the other at least one address as a source address, and a plurality of memory plane unit each having a memory unit, operating in synchronism with the memory cycles and in response to the start instruction input thereto, and set in one of an input mode, an output mode, and an alternate mode alternating between the input and output modes, in accordance with the plane control instruction input thereto, for selectively receiving one of the addresses as the source address from one of the three address buses and one of the control data from one of the two control buses, for reading out, from the memory unit, image data stored at the source address, to selectively output the readout image data onto one of the two data buses in a memory cycle next to a current memory cycle, in the output mode, for selectively receiving one of the addresses as the destination address from one of the three address buses, one of the control data from one of the two control buses and at least one image data from at least one of the two data buses, and for selectively executing a processing operation on the received image data and image data selectively read out from the destination address of the memory unit in accordance with the received control data, to store the executed result in the memory unit at the received address, in the input mode, in accordance with the plane control instruction.

As described above, an image data processing apparatus according to this invention has a simple structure. Though simple in structure, this apparatus can output addresses in a pipe line fashion and can perform at a high speed a data transfer between planes that is needed in a copying process and a swapping process between two memory planes, a three-term calculation between three planes, etc. By making associated memory planes perform a read modified write operation, it is unnecessary to delay a destination address by one memory cycle so that processing of one word can be executed in the same memory cycle. Therefore, the speed for the data transfer between planes is further improved, and the structure of an access controller can be simplified.

BRIEF DESCRIPTION OF THE DRAWINGS

FIG. 4 is a block diagram illustrating the structure of a bit map image data processing apparatus according to the first embodiment of this invention;

FIG. 5A is a block diagram illustrating the structure of a memory plane shown in FIG. 4;

FIG. 5B is a block diagram illustrating the structure of an arithmetic and logic unit (ALU) shown in FIG. 5A;

FIG. 10 is a diagram for explaining execution of a swapping process according to the first embodiment;

FIGS. 11A to 11E illustrate timing charts for explaining the operation of the swapping process;

FIGS. 19A to 19E illustrate timing charts for explaining the operation of the swapping process;

DETAILED DESCRIPTION OF PREFERRED EMBODIMENTS

Figure 1:
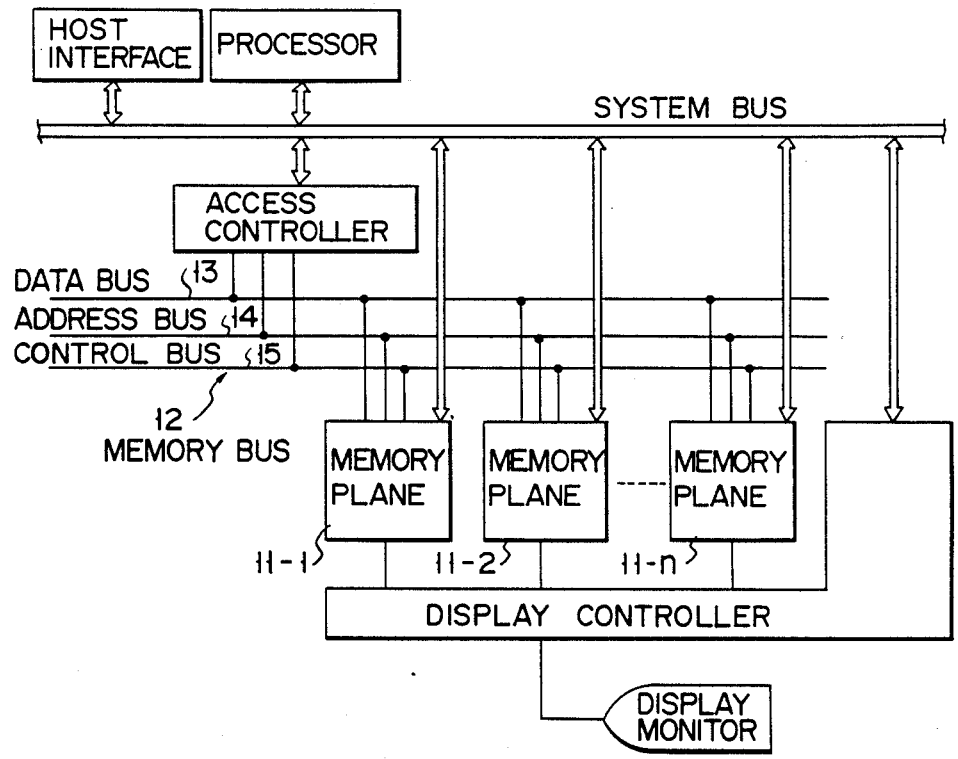
FIG. 1 is a block diagram illustrating the structure of a conventional bit map image data processing apparatus.
Figure 2:
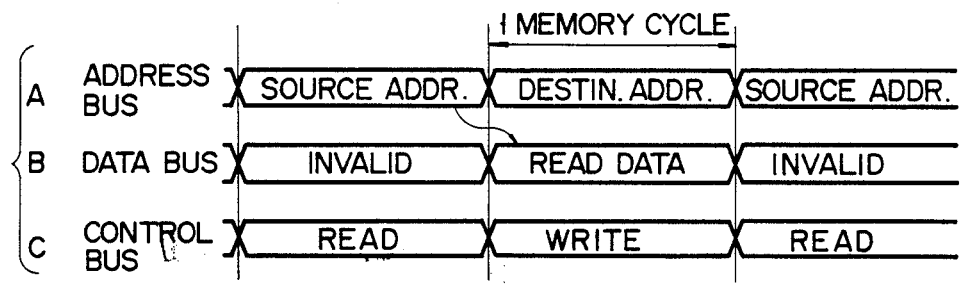
FIGS. 2A to 2C illustrate timing charts for explaining the operation of the apparatus shown in FIG. 1.
Figure 3:
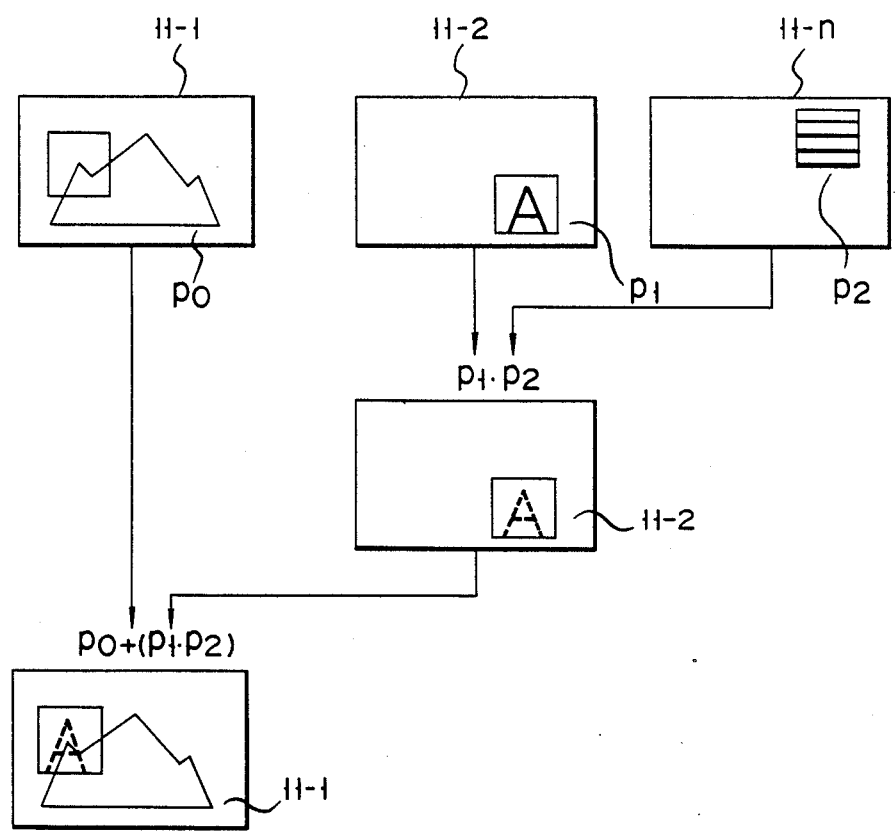
FIG. 3 is a diagram for explaining the operation of a three-term calculation.

Referring to the accompanying drawings, a bit map image data processing apparatus according to this invention will now be explained in detail.

To begin with, referring to FIG. 4 the block structure of a bit map image data processing apparatus according to the first embodiment of this invention will be explained below.

Bit map memory planes 30-i (i=1 to n) are coupled to system bus 22 and memory bus 50 that includes address buses 52a to 52c, control buses 53a and 53b and data buses 51a and 51b. The functions of memory planes 30-i (i=1 to n), namely, an output mode for a read operation, an input mode for a write operation or an alternate mode alternating between the input and output modes is set in accordance with a plane control instruction entered from processor 21 through system bus 22. Memory plane 30-i (i=1 to n) stores image data or a pattern of chinese characters, symbols or the like. Memory plane 30-i (i=1 to n) reads out image data from the location specified by an address input from an address bus and outputs it onto a data bus, in accordance with read control data input from the control bus in the output mode. In accordance with write control data from a control buses, memory plane 30-i (i=1 to n) stores image data input from a data bus at the location specified by an address coming from an address bus. Further, in accordance with read modified write (RMW) control data input from the control bus, memory planes 30-i (i=1 to n) reads out image data from the location specified by an address entered from an address bus, executes a processing operation on the readout image data and image data from the data buses and stores the result at the location specified by the entered address.

Display controller 42 reads out image data stored in memory planes 30-i (i=1 to n) and displays it on a display monitor 41 in accordance with a display control instruction input through system bus 22. Access controller 60 controls access to memory planes 30-i (i=1 to n) in accordance with an access control instruction from system bus 22. This controller 60 outputs addresses onto the address buses and outputs control data onto the control buses.

Host interface 23 is a communication interface between the bit map image data processing apparatus and a host computer or the like (not shown), and when an image data processing command is input, it transfers the command to processor 21 through system bus 22. In response to the image data processing command, processor 21 outputs the access control instruction to controller 60, the plane control instruction to memory planes 30-i (i=1 to n) and the display control instruction to display controller 42. Then, processor 21 outputs a start instruction to controller 60 and memory planes 30-i (i=1 to n).

Referring now to FIG. 5A, the block structure of memory plane 30-i (i=1 to n) will be explained in detail. In FIG. 5A multiplexer (MUX) 32-i is coupled to address buses 52a to 52c while another multiplexer (MUX) 33-i is coupled to control buses 53a and 53b. MUXs 32-i and 33-i operate in synchronism with a memory cycle in response to a start instruction from processor 21. Decoder 34-i controls from which address bus MUX 32-i should pass an address and from which control bus MUX 33-i should pass in control data, in accordance with the plane control instruction.

Memory 31-i (i=1 to n), which may be constituted by a RAM, has address input port ADDR receiving an address from MUX 32-i, control data input port CTRL receiving control data from MUX 33-i and data input-/output port DATA, in synchronism with a memory cycle. In accordance with the read control data input to port CTRL from MUX 33-i (i-1 to n), memory 31-i (i=1 to n) reads out image data from the location specified by an address input to port ADDR from MUX 32-i and outputs the data from port DATA onto the data bus through register 36-i and driver 37-i. Also, in accordance with write control data input to port CTRL from MUX 33-i, memory 31-i (i=1 to n) stores image data input to port DATA from arithmetic and logic unit (ALU) 35-i (i=1 to n) at the location specified by an address input to port ADDR from MUX 32-i. Further, in accordance with RMW control data input from MUX 33-$i$ ($i=1$ to n), memory 31-$i$ ($i=1$ to n) reads out image data from the location specified by an address input to port ADDR from MUX 32-$i$ ($i=1$ to n), outputs the data from the port DATA into register 36-$i$ ($i=1$ to n), and stores a processing result input from ALU 35-$i$ ($i=1$ to n) at the location specified by the address input to port ADDR.

Control signal generator 39-$i$ ($i=1$ to n) outputs a control signal to register 36-$i$ ($i=1$ to n) in accordance with the control data selected by MUX 33-$i$ ($i=1$ to n) in synchronism with a memory cycle. Register 36-$i$ ($i=1$ to n) controls the transfer of image data output from memory 31-$i$ ($i=1$ to n), in accordance with the control signal from generator 39-$i$ ($i=1$ to n). When the control data is read control data, register 36-$i$ ($i=1$ to n) latches image data from memory 31-$i$ ($i=1$ to n) and outputs it to driver 37-$i$ ($i=1$ to n) in the next memory cycle in the output mode. When the control data is the RMW control data, register 36-$i$ ($i=1$ to n) latches image data read out from memory 31-$i$ ($i=1$ to n) and outputs it to a right input terminal of ALU 35-$i$ ($i=1$ to n), not to driver 37-$i$ ($i=1$ to n) because of inhibition of an output, in the input mode. In accordance with the plane control instruction, decoder 38-$i$ ($i=1$ to n) controls to which data bus driver 37-$i$ ($i=1$ to n) should output image data from register 36-$i$ ($i=1$ to n).

Figures 5C, 5D:
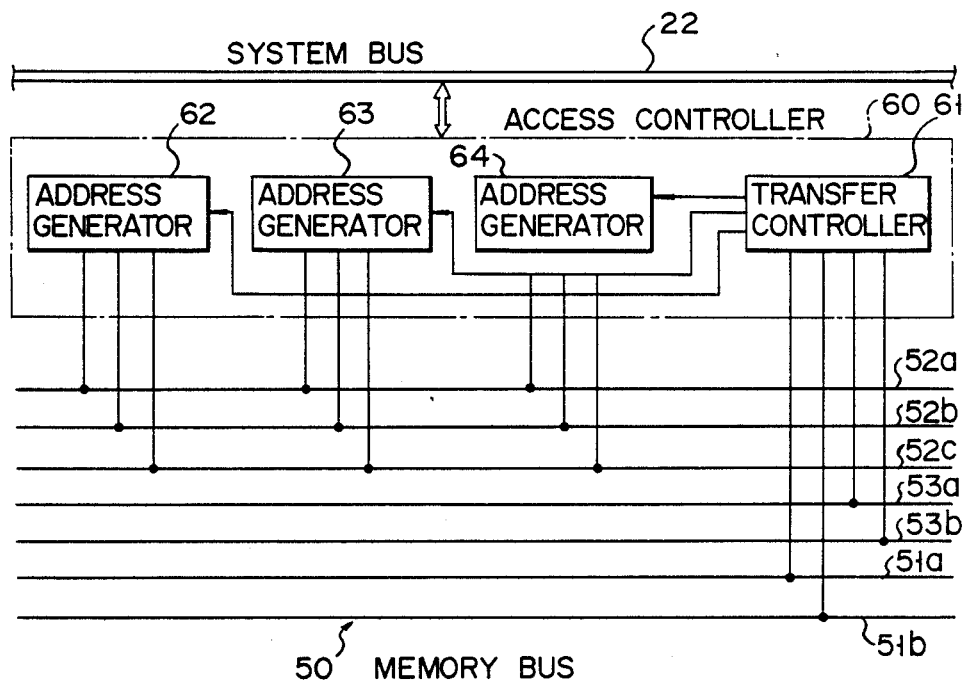
FIG. 5C is a diagram for explaining the operation of the ALU shown in FIG. 5B.
FIG. 5D is a block diagram illustrating the structure of an access controller.
Figure 6:
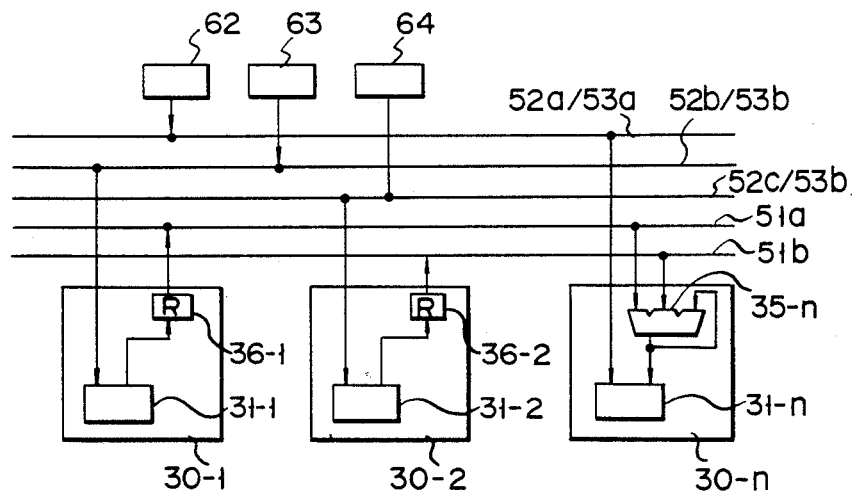
FIG. 6 is a diagram for explaining execution of a three-term calculation according to the first embodiment.

ALU 35-$i$ ($i=1$ to n) has its left input terminal coupled to data bus 51$a$, its center input terminal to data bus 51$b$ and its right input terminal to register 36-$i$ ($i=1$ to n). ALU 35-$i$ ($i=1$ to n) can not receive image data from data bus 51$a$ or 51$b$ in the output mode. FIG. 5B illustrates the structure of ALU 35-$i$ ($i=1$ to n). A calculation result is written into table 135-$i$ ($i=1$ to n) as part of the plane control instruction output from processor 21 in accordance with the image data process command. When data X and Y are input to ALU 35-$i$ ($i=1$ to n) from data buses 51$a$ and 51$b$ and data Z input to the ALU from register 36-$i$ ($i=1$ to n) as selection data, a selector 136-$i$ ($i=1$ to n) refers to table 135-$i$ ($i=1$ to n) and outputs the calculation result W into memory 31-$i$ ($i=1$ to n). FIG. 5C illustrates an example of the calculation result stored in table 135-$i$ ($i=1$ to n). In this example, for the sake of simplicity, the image data is 1-bit data. The result of a three-term calculation, i.e. logic sum of data X and a logic product of data Y and data Z is stored in table 135-$i$ ($i=1$ to n). As should be obvious from FIG. 5C, the calculation result stored in table 135-$i$ ($i=1$ to n) may take 256 different forms. In this manner it is possible to set a left input through mode, a center through mode, or a right through mode in which the image data input to the left input terminal, the center input terminal, or the right input terminal is output to memory 31-$i$ ($i=1$ to n), a three-term calculation mode, etc.

Driver 37-$i$ ($i=1$ to n) outputs image data from register 36-$i$ ($i=1$ to n) onto data bus 51$a$ or 51$b$ in accordance with a control signal from decoder 38-$i$ ($i=1$ to n) in the output mode. However, driver 37-$i$ ($i=1$ to n) can not output image data onto data bus 51$a$ or 51$b$ in the input mode. Decoder 38-$i$ ($i=1$ to n) is set in accordance with the plane control instruction.

Referring now to FIG. 5D the structure of access controller 60 will be explained. Controller 60 comprises address generators 62, 63 and 64 and transfer controller 61. Transfer controller 61, which is coupled to control buses 53$a$ and 53$b$ and data buses 51$a$ and 51$b$, is set in accordance with the access control instruction from processor 21. Upon reception of a start instruction from processor 21, controller 61 responds to a memory cycle, and outputs control data onto the control buses and a control instruction to address generators 62–64. These generators 62–64, which are respectively coupled to address buses 52$a$–52$c$, generate an address of a rectangular region, on memory planes to be accessed, specified by the access control instruction, in accordance with the control instruction from controller 61. The each generated address is output onto the address bus specified by the access control instruction.

Referring to FIG. 6 and FIGS. 7A to 7G, the operation of the first embodiment of this invention will now be explained with a particular case in which the content of a memory region A on memory plane 30-1, the content of another memory region B on memory plane 30-2 and the content of another memory region C on memory plane 30-$n$ are subjected to a three-term calculation and the result is written into memory plane 30-$n$.

When the three-term calculation command is input as the image data processing command, processor 21 outputs an access control instruction to access controller 60. In address generators 63 and 64, object regions A and B for source memory read addresses to be generated are specified in accordance with the access control instruction. In address generator 62 another object region C for destination memory write addresses to be generated is specified according to the access control instruction. Transfer controller 61 is set by the access control instruction to output the RMW control data onto control bus 53$a$ and the read control data onto control bus 53$b$.

Decoders 34-$i$ ($i=1, 2, n$) are set in accordance with the plane control instruction from processor 21 in such a way that memory planes 30-1, 30-2 and 30-$n$ respectively receive addresses from address buses 52$b$, 52$c$ and 52$a$ and control data from control buses 53$b$, 53$b$ and 53$a$. Drivers 37-$i$ ($i=1, 2$) are controlled by decoder 38-$i$ ($i=1, 2$) in accordance with the plane control instruction in such a way that memory planes 30-1 and 30-2 output the image data read out from memories 31-1 and 31-2 onto data buses 51$a$ and 51$b$, respectively. Further, the result of the three-term, calculation is set in table 135-$n$ of ALU 35-$n$. In this manner all the memory planes except memory planes 30-1 and 30-2 are set in the output mode. Only destination memory plane 30-$n$ is set in the input mode. The register group for specifying the readout inhibition/allowance and write inhibition/allowance, though omitted in FIG. 5A, is actually provided in each memory plane 30-$i$ ($i=1$ to n) and is controlled by the plane control instruction from processor 21.

When the above setting operation is completed, processor 21 outputs the three-term calculation start instruction to transfer controller 61 of access controller 60 and to memory planes 30-$i$ ($i=1, 2, n$) through system bus 22. Controller 61 in turn outputs the control instruction to generators 62–64 so that the image data processing is executed according to the timing charts shown in FIGS. 7A to 7G.

Figure 7:
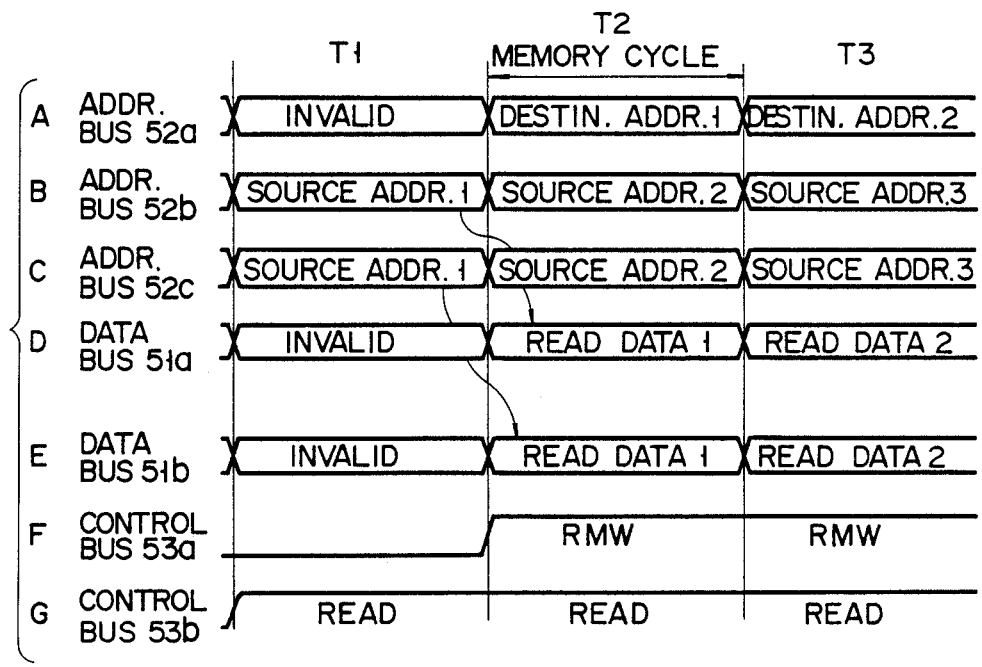
FIGS. 7A to 7G illustrate timing charts for explaining the operation of the three-term calculation.

More specifically, in the memory cycle T1 address generators 63 and 64 respectively generate source addresses for object regions A and B in accordance with the control instruction and output them onto address buses 52$b$ and 52$c$ in synchronism with a memory cycle, as indicated by FIGS. 7B and 7C. At the same time, as indicated by FIG. 7G, the read control data is output on control bus 53$b$ from controller 61. The addresses on address buses 52$b$ and 52$c$ are respectively supplied to memory planes 30-1 and 30-2 and are selected by MUX 32-$i$ ($i=1, 2$) to be supplied to ports ADDR of memories 31-$i$ ($i=1, 2$). The read control data on control bus 53$b$ is supplied through MUX 33-$i$ ($i=1, 2$) to ports CTRL of memories 31-$i$ ($i=1, 2$) of memory planes 30-1 and 30-2. As a result, in memory planes 30-$i$ ($i=1, 2$) which are set in the output mode, image data is read out from memory 31-$i$ ($i=1, 2$) and held in registers 36-$i$ ($i=1, 2$).

In the memory cycle T2, as indicated by FIGS. 7D and 7E, the image data held in registers 36-$i$ ($i=1, 2$) are output through drivers 37-$i$ ($i=1, 2$) onto data buses 51$a$ and 51$b$. At the same time, the destination address for the object region C is output from generator 62 onto address bus 52$a$ as indicated by FIG. 7A and the RMW control data is output from controller 61 onto control bus 53$a$ as indicated by FIG. 7F. In memory plane 30-$n$ that has been set in the input mode, image data is read out from the location specified by the destination address on address bus 52$a$, is held in register 36-$n$ and is output to the right input terminal of ALU 35-$n$, in the first half of memory cycle T2 in accordance with the RMW control data. ALU 35-$n$ are also supplied at its left input and center input terminals with the image data on data buses 51$a$ and 51$b$. In the second half of memory cycle T2, the three-term calculation is performed between these input image data. The calculation result is stored in the location of memory 31-$n$ specified by the destination address.

In memory cycle T2, updated source addresses are output in a pipe line fashion onto address buses 52$b$ and 52$c$ from address generators 63 and 64 and the read control data is output onto control bus 53$b$ from controller 61, as indicated by FIGS. 7B, 7C and 7G. In memory planes 30-$i$ ($i=1, 2$), therefore, readout of the next image data is executed as described above. In this manner, the three-term calculation is executed in a pipe line fashion in synchronism with a memory cycle. Therefore, the operation speed is significantly improved as compared with the conventional image data processing apparatus.

Although the three-term calculation is performed with image data being 1-bit data in this example, the same calculation can be done with one-byte or one-word image data if the capacity of table 135-$n$ is increased. Further, control signal generator 39-$i$ ($i=1$ to $n$) operates based on the input control data; however, it is easy for those skilled in the art to design generator 39-$i$ ($i=1$ to $n$) so as to be set in accordance with the plane control instruction.

Figure 8:
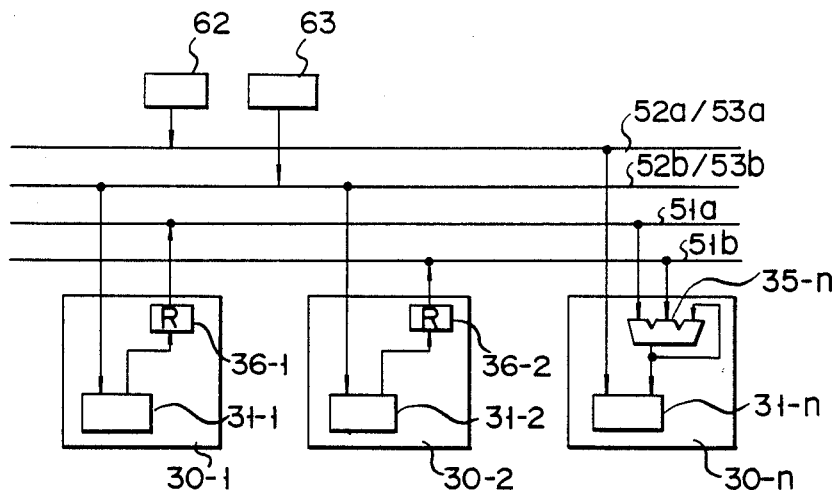
FIG. 8 is a diagram for explaining execution of a three-term calculation according to the first embodiment when target regions of a source plane are the same.
Figure 9:
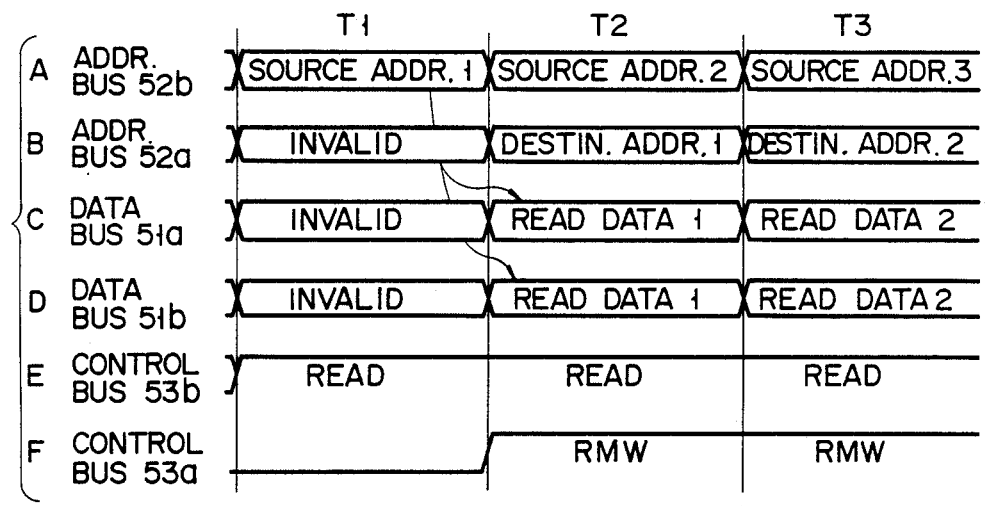
FIGS. 9A to 9F illustrate timing charts for explaining the operation of the three-term calculation.

In the three-term calculation between three memory planes, when memory planes 30-1 and 30-2 serving as the source memory planes can use a common source address region, address generator 64 and address bus 52$c$ can be omitted. The three-term calculation in this case will be explained below referring to the operation-explanatory diagram of FIG. 8 and the timing charts shown in FIGS. 9A to 9F. As an example that source memory planes 30-1 and 30-2 can use the common source address region, there is the case in which memory plane 30-2 is used exclusively for storing a drawing mask pattern and the drawing mask pattern can be read out only by some lower bits of the source address on address bus 52$b$ for memory plane 30-1. If the size of the readout object region of memory plane 30-1 is 2$n$ times that of the drawing mask pattern, a reading operation of the mask pattern needs to be repeated 2$n$ times.

In such a case of the three-term calculation that memory planes 30-1 and 30-2 serving as the source memory planes can use a common source address region, access controller 60 and memory planes 30-$i$ ($i=1$ to n) can be set in the above-described manner, but memory plane 30-2 is set so as to receive the source address from address bus 52$b$. Thus, in this case, the three-term calculation can also be executed in the already-described manner as shown in FIGS. 9A to 9F.

A swapping operation that exchanges image data between the object region D of memory plane 30-1 and the object region E of memory plane 30-2 will be explained with reference to the operation-explanatory diagram of FIG. 10 and the timing charts shown in FIGS. 11A to 11E.

Upon reception of the swap processing command through host interface 23, processor 21 first outputs an access control instruction to access controller 60. Address generators 62 and 63 are set to respectively generate source/destination addresses for the object regions D and E in accordance with the access control instruction. Controller 61 is set so as to alternately output the write control data and read control data.

Processor 21 further outputs the plane control instruction to memory planes 30-$i$ ($i=1, 2$). Decoders 34-$i$ of memory planes 30-1 ($i=1, 2$) are set in accordance with the plane control instruction such that they receive addresses from address buses 52$a$ and 52$b$ and the control data from control bus 53$a$, respectively. Decoders 38-$i$ ($i=1, 2$) are set in accordance with the plane control instruction such that the image data from registers 36-$i$ ($i=1, 2$) are output to data buses 51$b$ and 51$a$. In addition ALU 35-$i$ ($i=1, 2$) in memory planes 30-$i$ ($i=1, 2$) are set in the left input through mode and center input through mode, respectively. Also, only memory planes 30-1 and 30-2 of memory planes 30-$i$ ($i=1$ to n) are set in the alternate.

When the above setting operation is completed, processor 21 outputs the swapping start instruction to transfer controller 61 and memory planes 30-$i$ ($i=1, 2$). Controller 61 in turn outputs the control instruction to generators 62 and 63 based on the start instruction. In accordance with the control instruction, generators 62 and 63 generate the source addresses for the object regions D and E and outputs the addresses onto address buses 52$a$ and 52$b$, as indicated by FIGS. 11A and 11B, in the memory cycle T1. At the same time, controller 61 outputs the read control data onto control bus 53$a$ as indicated by FIG. 11E. Therefore, addressed image data are read out from memories 31-$i$ ($i=1, 2$) of memory plane 30-$i$ ($i=1, 2$) in response to the start instruction and the read-out image data are held in registers 36-$i$ ($i=1, 2$).

In the memory cycle T2, the image data held in registers 36-$i$ ($i=1, 2$) are output onto data buses 51$b$ and 51$a$ as indicated by FIGS. 11C and 11D. At this time, since the write control data is output onto control bus 53$a$ from controller 61 as indicated by FIG. 11E, memory planes 30-$i$ ($i=1, 2$) input the image data on data buses 51$a$ and 51$b$ to the left input and center input terminals of ALU 35-$i$ ($i=1, 2$) and store the input image data at the locations of memories 31-$i$ ($i=1, 2$) that are specified by the destination addresses on address buses 52$a$ and 52$b$, respectively.

In the memory cycle T3, updated addresses are output on address buses 52$a$ and 52$b$ as indicated by FIGS. 11A and 11B. Meanwhile the read control data is output on control bus 53$a$ from controller 61. The swap processing of the image data on the regions D and E can be executed in two memory cycles per word by executing the same processes as have been done in the memory cycles T1 and T2 as the addresses are updated.

Figure 12:
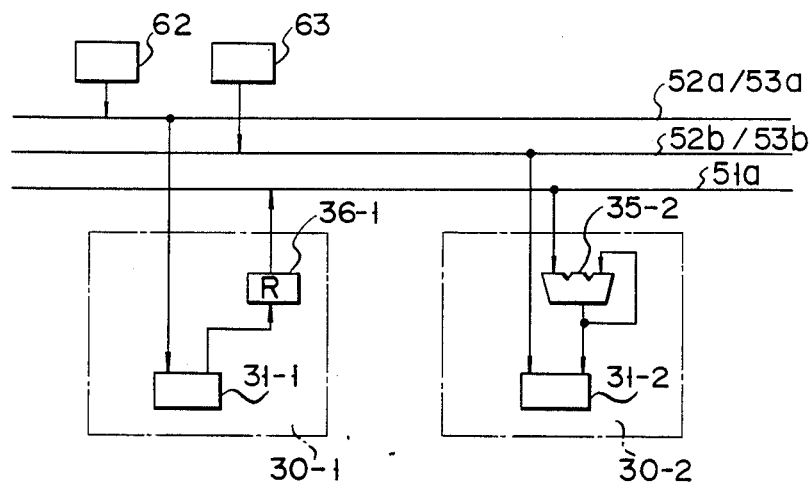
FIG. 12 is a diagram for explaining execution of a copying process according to the first embodiment.

A copy processing for copying the content of object region F on memory plane 30-1 to object region G on memory plane 30-2 will now be explained referring to the operation-explanatory diagram of FIG. 12 and the timing charts shown in FIGS. 13A to 13E.

When the copy processing command is input to host interface 23, this command is transferred to processor 21, which in turn outputs an access control instruction to access controller 60. Address generator 62 is set so as to generate the source memory read address for the object region F in accordance with the access control instruction. Address generator 63 is set so as to generate the destination memory write address for the object region G in accordance with the access control instruction. Transfer controller 61 is set so as to output the read control data onto control bus 53a and the write control data onto control bus 53b.

Processor 21 outputs a plane control instruction to memory planes 30-1 and 30-2. Decoders 34-$i$ of memory planes 30-$i$ ($i=1, 2$) are set in accordance with the plane control instruction such that MUX 32-$i$ ($i=1, 2$) of memories 31-$i$ ($i=1, 2$) receive source and destination addresses from address buses 52a and 52b and MUX 33-$i$ ($i=1, 2$) receive the read and write control data from control buses 53a and 53b. Further, decoder 38-1 is set in accordance with the plane control instruction such that driver 37-1 outputs the image data from register 36-1 onto data bus 51a. In addition, ALU 35-2 is set in the left input through mode in accordance with the plane control instruction. Only source memory plane 30-1 of memory planes 30-$i$ ($i=1$ to n) is set in the output mode, and only memory plane 30-2 is set in the input mode, in accordance with the plane control instruction.

Figure 13:
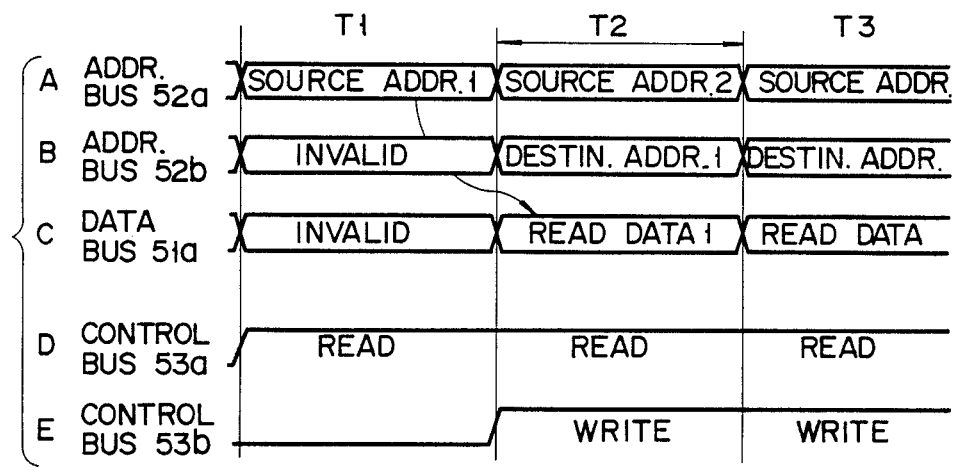
FIGS. 13A to 13E illustrate timing charts for explaining the operation of the copying process.
Figure 14:
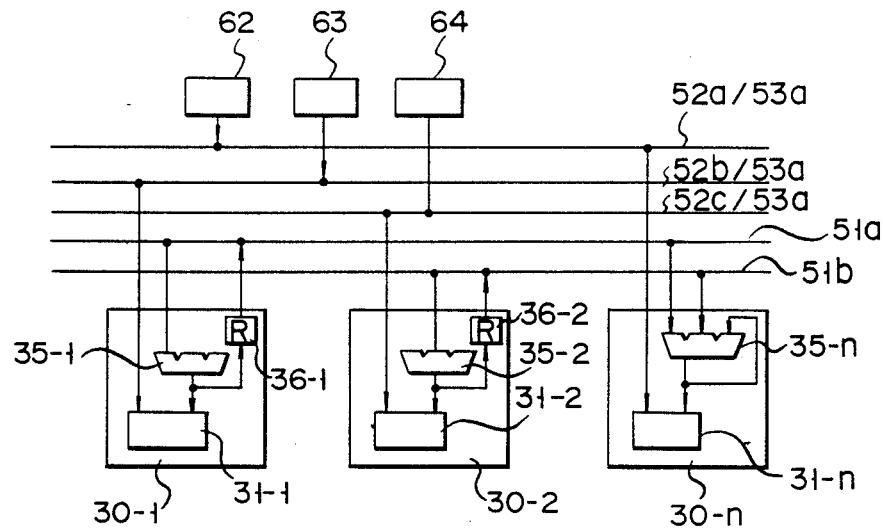
FIG. 14 is a diagram for explaining execution of a three-term calculation according to the second embodiment.

When the above setting operation is completed, processor 21 outputs the copy start instruction to transfer controller 61 of access controller 60 and memory planes 30-$i$ ($i=1, 2$) through system bus 22. Controller 61 then outputs the read control data onto control bus 53a as indicated by FIG. 13D in memory cycle T1 and outputs the control instruction to generators 62 to 63. In accordance with the control instruction, generator 62 generates the source memory read address for object region F and outputs the address onto address bus 52a as indicated by FIG. 13A. Image data is read out from the source address and is latched in register 36-1 in memory plane 30-1, in response to the start instruction.

In memory cycle T2, the image data held in register 36-1 is output onto data bus 51a through driver 37-1 as indicated by FIG. 13C. At this time, the write control data is output onto control bus 53b from controller 61 as indicated by FIG. 13E and the destination address for object memory region G is output on address bus 52b from address generator 63, as indicated by FIG. 13B. Therefore, memory plane 30-2 inputs the image data on data bus 51a to the left input terminal of ALU 35-2. Since ALU 35-2 is set in the left input through mode, the input image data is supplied to port DATA of memory 31-2. This image data is stored at the location specified by the destination address. At this time, the next source address is output on address bus 52a from generator 62 as indicated by FIG. 13A. In this manner, the copying of one-word image data between memory planes 30-1 and 30-2 is executed in a pipe line fashion for each memory cycle.

The block structure of a bit map image data processing apparatus according to the second embodiment of this invention will now be explained. The second embodiment is almost similar in structure to the first embodiment shown in FIGS. 4 and 5A to 5D. Differences lie in register 36-$i$ ($i=1$ to n) and transfer controller 61.

Control signal generator 39-$i$ ($i=1$ to n) outputs a control signal to register 36-$i$ ($i=1$ to n) in accordance with the control data selected by MUX 33-$i$ ($i=1$ to n). Register 36-$i$ ($i=1$ to n) controls the transfer of image data output from memory 31-$i$ ($i=1$ to n), in accordance with the control signal from generator 39-$i$ ($i=1$ to n). When the control data is the RMW control data, register 36-$i$ ($i=1$ to n) passes image data read out from memory 31-$i$ to driver 37-$i$ ($i=1$ to n) in the first half of a memory cycle in accordance with the control signal. In the second half of the memory cycle, the read out image data is latched by register 36-$i$ ($i=1$ to n) and output to driver 37-$i$ ($i=1$ to n) in accordance with the control signal. Further, in accordance with the control signal register 36-$i$ ($i=1$ to n) outputs the latched image data to ALU 35-$i$ ($i=1$ to n). In accordance with the plane control instruction, decoder 38-$i$ controls to which data bus driver 37-$i$ ($i=1$ to n) should output image data from register 36-$i$ ($i=1$ to n). Memory plane 30-$i$ ($i=1$ to n) is set in the input mode, the output mode, or a input/output mode, in which the input mode and the output mode both are allowed, in accordance with the plane control instruction.

Transfer controller 61 is set in accordance with the access control instruction from processor 21. Controller 61 outputs the control instruction so that the destination address and the source address are output simultaneously in a pipe line fashion, in accordance with the start instruction from processor 21.

Referring to FIG. 14 and FIGS. 15A to 15F, the three-term operation of the second embodiment of this invention will now be explained. In this case, the content of a memory region A on memory plane 30-1, the content of another memory region B on memory plane 30-2 and the content of another memory region C on memory plane 30-$n$ are subjected to a three-term calculation and the result is written into memory plane 30-$n$.

When the three-term calculation command is input as the image data processing command, address generators 62–64 and decoders 34-$i$ ($i=1, 2, n$) of memory planes 30-$i$ ($i=1, 2, n$) are set in the same manner as is done in the three-term calculation in the first embodiment. Transfer controller 61 is set to output the RMW control data on control bus 53a, in accordance with the access control instruction from processor 21. ALU 35-$i$ ($i=1, 2, n$) are respectively set to the right input through mode, the right input through mode and the three-term calculation mode in accordance with the plane control instruction. Memory planes 30-$i$ ($i=1, 2, n$) are set in the output mode, the output mode and the input mode in accordance with the plane control instruction, respectively.

When the above setting operation is completed, processor 21 outputs the three-term calculation start instruction to transfer controller 61 of access controller 60 and memory planes 30-$i$ ($i=1, 2, n$) through system bus 22. Controller 61 in turn outputs the control instruction to generators 62–64 so that the image data processing is executed according to the timing charts shown in FIGS. 15A to 15F.

More specifically, in the memory cycle T1 address generators 62, 63 and 64 respectively generate a destination address for the object region C and source addresses for object regions A and B in accordance with the control instruction and output them onto address buses 52a, 52b and 52c as indicated by FIGS. 7A to 7C. At the same time, as indicated by FIG. 7F the RMW control data is output on control bus 53a from controller 61. The addresses on address buses 52a, 52b and 52c are respectively supplied to memory planes 30-n, 30-1 and 30-2 and are selected by MUX 32-$i$ ($i$=n, 1, 2) to be supplied to ports ADDR of memories 31-$i$ ($i$=n, 1, 2). The RMW (read modified write) control data on control bus 53a is selected by MUX 33-$i$ ($i$=1, 2, n) to be supplied to ports CTRL of memories 31-$i$ ($i$=1, 2, n). The selected RMW control data is also supplied to generator 39=$i$ ($i$=1, 2, n).

Figure 15:
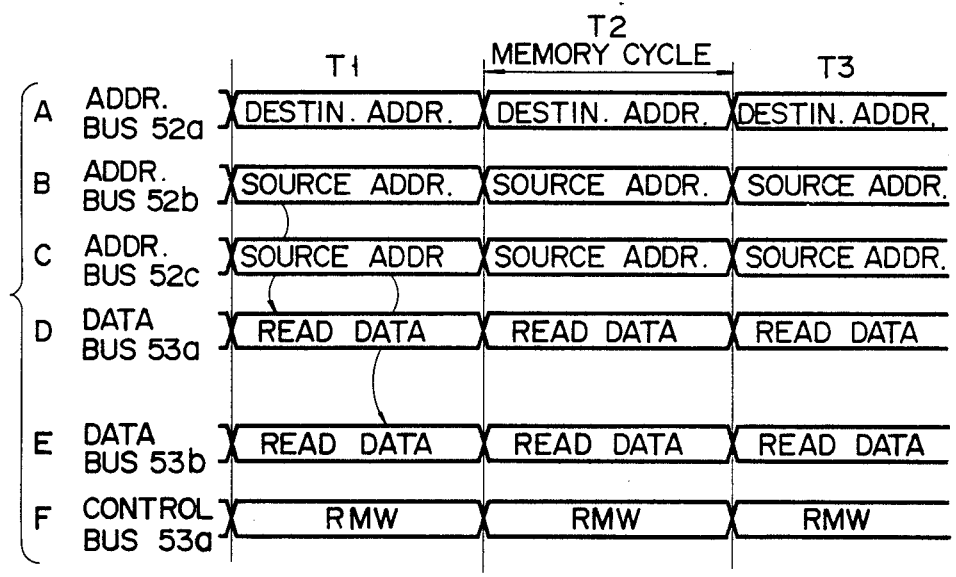
FIGS. 15A to 15F illustrate timing charts for explaining the operation of the three-term calculation.

In the first half of the memory cycle T1, in memory planes 30-$i$ ($i$=1, 2, n), image data are read out from memories 31-$i$ ($i$=1, 2, n) and are output to registers 36-$i$ ($i$=1, 2, n). The image data read out from memories 31-$i$ ($i$=1, 2) are supplied to data buses 51a and 51b through drivers 37-$i$ ($i$=1, 2) as indicated by FIGS. 15D and 15E since memory planes 30-1 and 30-2 are set in the output mode. The image data read out from memory 31-n is not output onto any data bus because of the input mode.

In the second half of the memory cycle T1, the image data read out from memory 31-$i$ ($i$=1, 2) are latched by registers 36-$i$ ($i$=1, 2) and are kept supplied to data buses 51a and 51b through drivers 37-1 ($i$=1, 2). Since memory planes 30-$i$ ($i$=1, 2) are both set in the right input through mode, the image data are written in memory 31-$i$ ($i$=1, 2) without varying. In memory plane 30-n, the image data on data buses 51a and 51b are respectively supplied to the left input terminal and the center input terminal. The right input terminal of ALU 35-n is supplied with the image data from register 36-n. Therefore, the three-term calculation on these image data can executed. The calculation result is stored at the location of memory 31-n specified by the destination address on address bus 52a. In this manner, the three-term calculation can be executed faster in the second embodiment than is done in the first embodiment.

Although the three-term calculation is performed with image data being 1-bit data in this example, the same calculation can be done with one-byte or one-word image data if the capacity of table 135-n is increased. Further, the operation of control signal generator 39-$i$ ($i$=1 to n) operates in accordance with the input control data, however, the operation of the generator 39-$i$ ($i$=1 to n) may be set in accordance with the plane control instruction.

Figure 16:
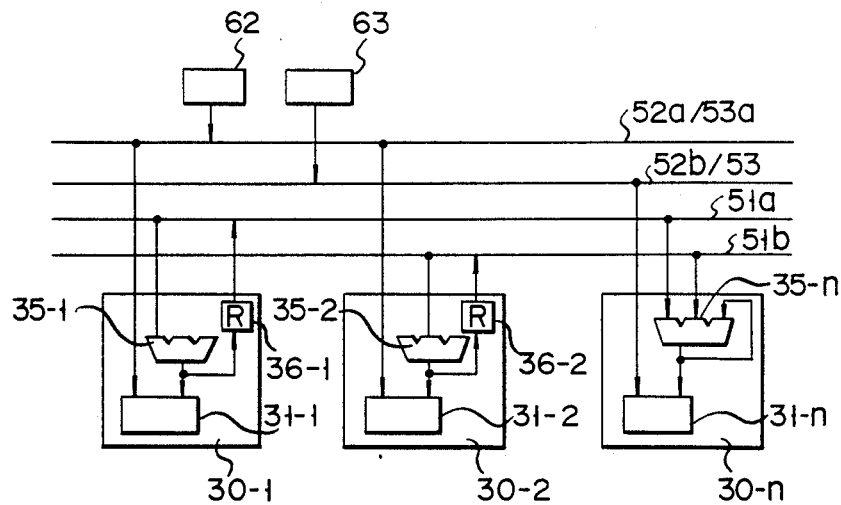
FIG. 16 is a diagram for explaining execution of a three-term calculation according to the second embodiment when target regions of a source plane are the same.
Figure 17:
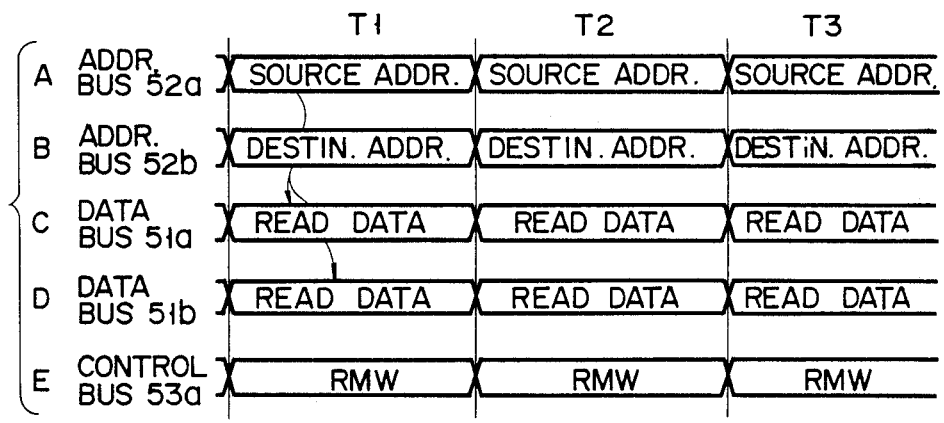
FIGS. 17A to 17E illustrate timing charts for explaining the operation of the three-term calculation.

The three-term calculation between memory planes in the case of the source address being used commonly, will now be explained referring to the operation-explanatory diagram of FIG. 16 and timing charts FIG. 17A to 17E.

In the three-term calculation between three memory planes, when memory planes 30-1 and 30-2 serving as the source memory planes can use a common source address, access controller 60 and memory planes 30-$i$ ($i$=1, 2) are set in the aforementioned manner, with memory plane 30-2 being set so as to receive the source address from address bus 52b. The three-term calculation can be executed in the same manner as has been done in the first embodiment.

Figures 18, 19:
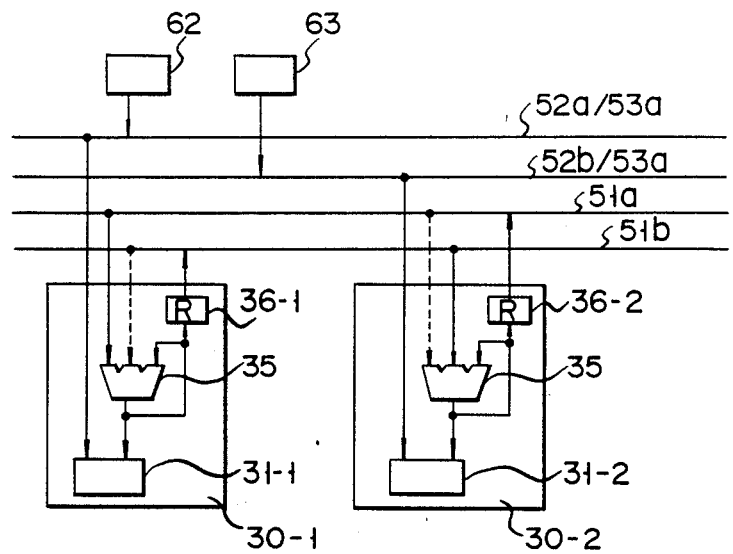
FIG. 18 is a diagram for explaining execution of a swapping process according to the second embodiment.

A swap operation between memory planes that exchanges image data between object memory region D of memory plane 30-1 and object memory region E of memory plane 30-2 will now be explained with reference to the operation-explanatory diagram of FIG. 18 and the timing charts of FIGS. 19A to 19E.

Upon reception of the swap processing command through host interface 23, processor 21 first outputs the access control instruction to access controller 60. Address generators 62 and 63 are set to respectively generate source/destination addresses for object memory regions D and E in accordance with the access control instruction. Transfer controller 61 is set so as to alternately output the RMW control data onto control bus 53a.

Processor 21 further outputs the plane control instruction to memory planes 30-$i$ ($i$=1, 2). Decoders 34-$i$ ($i$=1, 2) of memory planes 30-1 ($i$=1, 2) are set in accordance with the plane control instruction such that they receive addresses from address buses 52a and 52b. Decoders 38-$i$ ($i$=1, 2) are set in accordance with the plane control instruction in a manner that it causes drivers 37-$i$ ($i$=1, 2) to output image data to data bus 51a or 51b. In addition ALU 35-$i$ ($i$=1, 2) in memory planes 30-$i$ ($i$=1, 2) are set in the left input through mode and the center input through mode, respectively. Only memory planes 30-1 and 30-2 are set in the input/output mode, in accordance with the plane control instruction.

When the above setting operation is completed, processor 21 outputs the swap start instruction to transfer controller 61 and memory planes 30-1 and 30-2. Controller 61 in turn outputs the control instruction to generators 62 and 63 in accordance with the start instruction. In accordance with the control instruction, generators 62 and 63 generate the source addresses for object regions D and E and output the addresses onto address buses 52a and 52b, as indicated by FIGS. 19A and 19B, in the memory cycle T1. At the same time, controller 61 outputs the RMW control data onto control bus 53a as indicated by FIG. 19E. Therefore, in the first half of the memory cycle T1, memory planes 30-$i$ ($i$=1, 2) read out image data from memories 31-$i$ ($i$=1, 2) and the read-out image data are output through registers 36-$i$ ($i$=1, 2) to data buses 51a and 51b shown in FIGS. 19C and 19D.

In the second half of the memory cycle T1, the image data are held in registers 36-$i$ ($i$=1, 2) and the held data are output onto data buses 51b and 51a as indicated by FIGS. 19C and 19D. At this time, since the RMW control data is output onto control bus 53a from controller 61 as indicated by FIG. 19E, memory planes 30-$i$ ($i$=1, 2) input the image data on data buses 51a and 51b to the left input and center input terminals of ALU 35-$i$ ($i$=1, 2) and store the input image data at the locations of memories 31-$i$ ($i$=1, 2) that are specified by the source/destination addresses on address buses 52a and 52b.

In the subsequent memory cycle, the same operation is repeated while updating the addresses to execute the swap processing. In this manner, the swap processing in the second embodiment can be executed with a speed twice as fast as is realized in the first embodiment.

Figure 20:
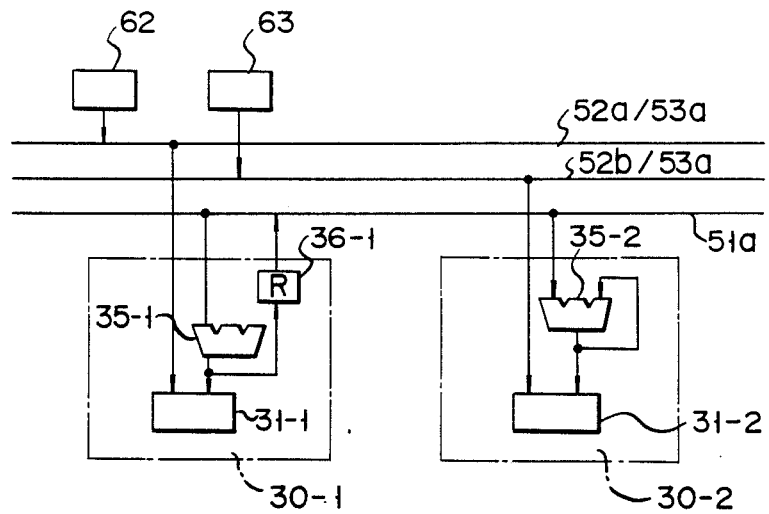
FIG. 20 is a diagram for explaining execution of a copying process according to the second embodiment.

Copy processing for copying the content of object memory region F on memory plane 30-1 to another object memory region G on memory plane 30-2 will now be explained, referring to the operation-explanatory diagram of FIG. 20 and the timing charts of FIG. 21A to 21D.

When the copy processing command is input to host interface 23, this command is transferred to processor 21, which in turn outputs the access control instruction to access controller 60. Address generator 62 is set so as to generate the memory read source address for object memory region F in accordance with the access control instruction. Address generator 63 is set so as to generate the memory write destination address for object memory region G in accordance with the access control instruction. Transfer controller 61 is set so as to output the RMW control data onto control bus 53a.

Processor 21 outputs the plane control instruction to memory planes 30-1 and 30-2 in accordance with the copy processing command. Decoders 34-i are set according to the plane control instruction such that MUX 32-i (i=1, 2) of memories 31-i (i=1, 2) receive source and destination addresses from address buses 52a and 52b. Further, decoder 38-1 is set in accordance with the plane control instruction such that driver 37-1 outputs the image data from register 36-1 onto data bus 51a. In addition ALU 35-i (i=1, 2) are set in the right input through mode and the left input through mode in accordance with the plane control instruction. Only source memory planes 30-i (i=1, 2) are set in the output mode and the input mode in accordance with the plane control instruction, respectively.

When the above setting operation is completed, processor 21 outputs the copy start instruction to transfer controller 61 of access controller 60 and memory planes 30-i (i=1, 2) through system bus 22.

Figure 21:
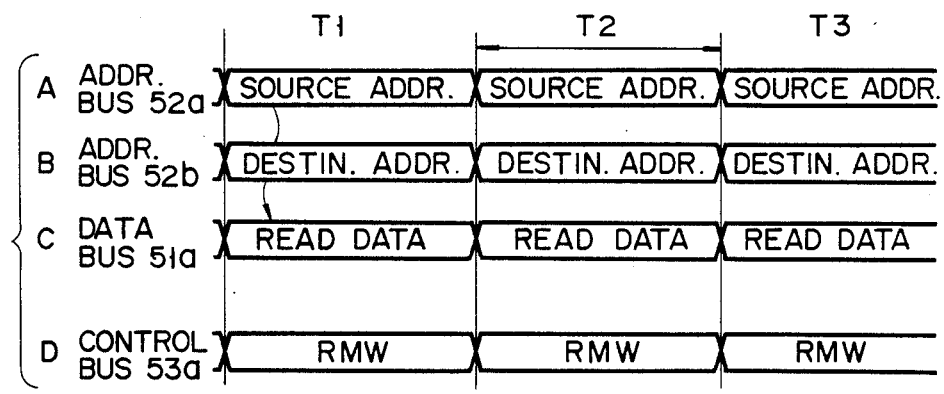
FIGS. 21A to 21D illustrate timing charts for explaining the operation of the copying process.

Controller 61 then outputs the RMW control data onto control bus 53a as indicated by FIG. 21D in the memory cycle T1 and outputs the control instruction to generators 62 and 63, in response to the start instruction. In accordance with the control instruction, generator 62 generates the source address for object region F and outputs the address onto address bus 52a as indicated by FIG. 21A. This causes the image data read out from memory 31-1 to be output onto data bus 51a from register 36-1 as indicated by FIG. 21C.

In the second half of the memory cycle T1, the read-out image data is latched by register 36-1 and the latched data is output onto data bus 51a, as indicated by FIG. 21C, and to ALU 35-1. Since the RAM control data has been output from controller 61 onto control bus 53a as indicated by FIG. 21E and the destination address for object memory region G has been output on address bus 52b from generator 63 as indicated by FIG. 21B, memory plane 30-2 inputs the image data on data bus 51a to the left input terminals of ALU 35-2. Since ALU 35-2 is set in the left input through mode, the input image data is supplied to the port DATA of memories 31-2. The image data is stored at the location specified by the destination address. The latched image data in resister 36-1 is stored at the source address. Then, the same process is taken in the memory cycle T2 and thereafter so that the copying of one-word image data between memory planes 30-1 and 30-2 is executed in a pipe line fashion for each memory cycle.

What is claimed is:

1. An image data processing apparatus for processing image data in a pipe line fashion, comprising:
    first and second address buses;
    a control bus;
    a first data bus;
    means for providing an input processing command;
    main control means for generating an access control instruction and a memory plane control instruction in response to said input processing command;
    access control means connected to said first and second address buses, said control bus, and said first data bus and operating in synchronism with machine cycles and in response to said access control instruction from said main control means, for selectively generating and respectively outputting onto said first and second address buses first and second addresses, and for generating and outputting onto said control bus read-modified-write control data;
    a first memory plane connected to said first address bus, said control bus, and said first data bus, and operating in synchronism with said machine cycles and in response to said memory plane control instruction from said main control means and said read-modified-write control data from said access control means, comprising:
        first memory plane memory means for outputting first image data stored at said first address over said first address bus at a first half of each machine cycle, and
        first memory plane data output means for outputting said first image data as first transfer data onto said first data bus at said first half of cycle, and
    a second memory plane connected to said second address bus, said control bus, and said first data bus, and operating in synchronism with said machine cycles and in response to said memory plane control instruction from said main control means and said read-modified-write control data from said access control means, comprising:
        second memory plane processing means for receiving said first transfer data from said first data bus as first operation data at a second half of each machine cycle and performing a first operation designated by said memory plane control instruction, on said first operation data to obtain second image data, and
        second memory plane memory means for storing said second image data at said second address at said second half of each machine cycle.

2. An apparatus according to claim 1, wherein said second memory plane processing means comprises:
    table means storing operation results; and referring means for referring to said table means in accordance with said first operation data to obtain said second image data.

3. An apparatus according to claim 1, wherein said processing command is a copy command.

4. An apparatus according to claim 1, wherein an identical memory address area is assigned to said first memory plane and second memory plane memory means, said processing command is a copy command associated with an memory address sub-area in said identical memory address area, said access control means includes means for generating and outputting onto said first address bus said first address, said second memory plane further comprises means for outputting said first address over said first address bus as said second address.

5. An apparatus according to claim 1, further comprising a second data bus, to which said first and second memory planes are connected, and wherein said processing command is a swap command,
    said first memory plane further comprises first memory plane processing means for receiving second transfer data from said second data bus as second operation data at said second half of each machine cycle and performing a second operation designated by said memory plane control instruction, on said second operation data to obtain said first image data,
    said first memory plane memory means further comprises means for storing said first image data at said first address at said second half of each machine cycle, said second memory plane memory means further comprises means for outputting said second image data stored at said second address at said first half of each machine cycle, and said second memory plane further comprises second memory plane data output means for outputting said second image data as said second transfer data onto said second data bus at said first half of each machine cycle.

6. An apparatus according to claim 5, wherein an identical memory address area is assigned to said first memory plane and second memory plane memory means, said swap command being associated with a memory address sub-area in said identical memory address area, said access control means includes means for generating and outputting onto said first address bus said first address, said second memory plane further comprises means for outputting said first address over said first address bus as said second address to said second memory plane memory means.

7. An apparatus according to claim 1, further comprising:

a third address bus;

a second data bus, to which said second memory plane is connected; and a third memory plane connected to said third address bus, said control bus, and said second data bus, and operating in synchronism with said machine cycles and in response to said memory plane control instruction from said main control means and said read-modified-write control data from said access control means, comprising:

third memory plane memory means for outputting third image data stored at a third at said first half of each machine cycle, and third memory plane data output means for outputting said third image data as second transfer data onto said second data bus, and wherein said processing command is a three term operation command;

said access control means further comprises means for selectively generating and outputting onto said third address bus said third address, said second memory plane further comprises second memory plane data output means for said second image data, which is input thereto at said first half of each machine cycle, to said second memory plane processing means at said second half of each machine cycle, said second memory plane processing means further comprises means for receiving said first and second transfer data from said first and second data buses and said second image data from said second memory plane data output means, as second operation data at said second half of each machine cycle and performing a second operation designated by said memory plane control instruction, on said second operation data to obtain said second image data, and said second memory plane memory means further comprises means for outputting said second image data stored at said second address to said second memory plane data output means at said first half of each machine cycle.

8. An apparatus according to claim 7, wherein an identical memory address area is assigned to said first memory plane and third memory plane memory means, said three term operation command being associated with an identical memory address sub-area in said identical memory address area, and another memory address sub-area in another memory address area assigned to said second memory plane memory means, said access control means includes means for generating and outputting onto said first and second address buses said first and second addresses, said third memory plane further comprises means for outputting said first address over said first address bus as said third address to said second memory plane memory means.

9. A method of processing image data in a pipe line fashion, comprising:

providing a processing command, generating an access control instruction and a memory plane control instruction in response to said processing command;

in synchronism with machine cycles and in response to said access control instruction, selectively generating first and second addresses, and generating access control data;

in a first memory plane, in synchronism with said machine cycles and in response to said memory plane control instruction and said access control data, transferring as first transfer data first image data stored at said first address of a first memory onto a first data bus, and in a second memory plane, in synchronism with said machine cycles and in response to said memory plane control instruction and said access control data, receiving said first transfer data from said first data bus as first operation data, performing a first operation designated by said memory plane control instruction, on said first operation data to obtain second image data, and storing said second image data at said second address of a second memory.

10. A method according to claim 9, wherein said performing said first operation step including referring to a table in accordance with said first operation data to obtain said second image data, said table storing operation results.

11. A method according to claim 9, wherein said processing command is a copy command.

12. A method according to claim 9, wherein said storing of said second image data includes storing said second image data at said first address of said second memory when an identical memory address area is assigned to said first and second memory and said processing command is a copy command associated with a memory address sub-area in said identical memory address area.

13. A method according to claim 9, further comprising:

in said second memory plane, in synchronism with said machine cycles and in response to said memory plane control instruction and said access control data, transferring as second transfer data said second image data stored at said second address of said second memory onto a second data bus, and in said first memory plane, in synchronism with said machine cycles and in response to said memory plane control instruction and said access control data, receiving said second transfer data from said second data bus as second operation data, performing a second operation designated by said memory plane control instruction, on said second operation data to obtain said first image data, and storing said first image data at said first address of said first memory.

14. A method according to claim 13, wherein said storing of said second image data includes storing said second image data at said first address of said second memory when an identical memory address area is assigned to said first and second memory and said processing command is a copy command associated with a memory address sub-area in said identical memory address area.

15. A method according to claim 9, further comprising:
    generating a third address; and
    in a third memory plane, in synchronism with said machine cycles and in response to said memory plane control instruction and said access control data, transferring third image data stored at said third address of a third memory as second transfer data onto a third data bus, and wherein
    said performing of said first operation further comprises:
        reading out said second image data stored at said second address of said second memory, performing said first operation, designated by said memory plane control instruction, on said first and second transfer data and said read-out second image data and storing an operation result as said second image data at said second address of said second memory.

16. A method according to claim 15, wherein said transferring said third image data includes making said first
    address to be said third address when an identical memory address area is assigned to said first and third memory and said processing command is a three term operation associated with an identical memory address sub-area in said identical memory address area.

17. An image data processing apparatus for processing image data in a pipe line fashion, comprising:
    first and second address buses;
    first and second control buses;
    a first data bus;
    means for providing an input processing command;
    main control means for generating an access control instruction and a memory plane control instruction in response to said input processing command;
    access control means connected to said first and second address buses, said first and second control buses, and said first data bus and operating in synchronism with machine cycles and in response to said access control instruction from said main control means, for selectively generating and respectively outputting onto said first and second address buses first and second addresses, and for generating and respectively outputting read and write control data onto said first and second control buses;
    a first memory plane connected to said first address bus, said first control bus, and said first data bus, and operating in synchronism with said machine cycles and in response to said memory plane control instruction from said main control means and said read control data from said access control means, comprising:
        first memory plane memory means for outputting first image data stored at said first address over said first address bus at a first machine cycle of said machine cycles, and first memory plane data output means for outputting said first image data as first transfer data onto said first data bus at said first machine cycle; and
    a second memory plane connected to said second address bus, said second control bus, and said first data bus, and operating in synchronism with said machine cycles and in response to said memory plane control instruction from said main control means and said write control data from said access control means, comprising:
        second memory plane processing means for receiving said first transfer data from said first data bus as first operation data at a second machine cycle of said machine cycles and performing a first operation designated by said memory plane control instruction, on said first operation data to obtain second image data, and
        second memory plane memory means for storing said second image data at said second address at said second machine cycle.

18. An apparatus according to claim 17, wherein said second memory plane processing means comprises:
    table means storing operation results; and
    referring means for referring to said table means in accordance with said first operation data to obtain said second image data.

19. An apparatus according to claim 17, further comprising a second data bus, said first memory plane being connected to said second data bus and said second control bus, said second memory plane being connected to said second data bus and said first control bus, and wherein said processing command is a swap command,
    said first memory plane further comprises first memory plane processing means for receiving second transfer data from said second data bus as second operation data at said second machine cycle and performing a second operation designated by said memory plane control instruction, on said second operation data to obtain said first image data,
    said first memory plane memory means further comprises means for storing said first image data at said first address at said second machine cycle,
    said second memory plane memory means further comprises means for outputting said second image data stored at said second address at said first machine cycle, and
    said second memory plane further comprises second memory plane data output means for outputting said second image data as said second transfer data onto said second data bus at said second machine cycle.

20. An apparatus according to claim 17, further comprising:
    a second data bus, to which said second memory plane is connected; and
    a third memory plane connected to said third address bus, said first control bus, and said second data bus, and operating in synchronism with said machine cycles and in response to said memory plane control instruction from said main control means and said read control data from said access control means, comprising:
        third memory plane memory means for outputting third image data stored at a third address at a first half of each machine cycle, and
        third memory plane data output means for outputting said third image data as second transfer data onto said second data bus at said first machine cycle, and wherein said processing command is a three term operation command, said access control means further comprises means for selectively generating and outputting onto said third address bus said third address, said second memory plane further comprises second memory plane data output means for outputting said second image data, which is input thereto at said first machine cycle, to said second memory plane processing means at said second machine cycle, and said second memory plane processing means further comprises means for receiving said first and second transfer data from said first and second data buses and said second image data from said second memory plane data output means, as second operation data at said second machine cycle and performing a second operation designated by said memory plane control instruction, on said second operation data to obtain said second image data.

* * * * *